(12) United States Patent
De Jesus

(10) Patent No.: US 9,973,059 B1
(45) Date of Patent: May 15, 2018

(54) VEHICLE WHEEL GENERATOR SYSTEM

(71) Applicant: Roberto De Jesus, San Juan, PR (US)

(72) Inventor: Roberto De Jesus, San Juan, PR (US)

( * ) Notice: Subject to any disclaimer, the term of this patent is extended or adjusted under 35 U.S.C. 154(b) by 0 days. days.

(21) Appl. No.: 15/687,519

(22) Filed: Aug. 27, 2017

Related U.S. Application Data

(60) Provisional application No. 62/408,276, filed on Oct. 14, 2016.

(51) Int. Cl.
*H02K 7/00* (2006.01)
*H02K 7/18* (2006.01)
*B60L 11/14* (2006.01)

(52) U.S. Cl.
CPC ............ *H02K 7/1846* (2013.01); *B60L 11/14* (2013.01); *B60L 2220/44* (2013.01)

(58) Field of Classification Search
CPC ...... H02K 7/1846; H02K 7/006; H02K 21/24; H02K 11/046
USPC .................................... 310/67 R, 67 A, 75 C
See application file for complete search history.

(56) References Cited

U.S. PATENT DOCUMENTS

| | | | | |
|---|---|---|---|---|
| 2007/0063595 A1* | 3/2007 | Habibi | ................. | H02K 1/2786 310/67 A |
| 2007/0252452 A1* | 11/2007 | Ishimoto | ................... | B62J 6/12 310/67 A |
| 2008/0100183 A1* | 5/2008 | Kitamura | ................. | B62J 6/001 310/67 A |
| 2011/0156543 A1* | 6/2011 | Nakano | ..................... | B62J 6/12 310/67 A |
| 2012/0086183 A1* | 4/2012 | Ken | ...................... | B60C 19/122 280/260 |

* cited by examiner

*Primary Examiner* — Thanh Lam
(74) *Attorney, Agent, or Firm* — Luis Figarella

(57) ABSTRACT

An energy recovery system for a machine, and particularly a multi-wheeled vehicle, includes an energy generation component housed within one of said wheel assemblies, coupled to an energy storage component which selectively receives energy from said vehicle motion effect on said energy generation component and delivers said energy to a said energy storage component. In one embodiment, said energy generation is an electric generator, and said storage component is an electric battery.

4 Claims, 3 Drawing Sheets

VEHICLE WHEEL GENERATOR SYSTEM

FIELD OF THE INVENTION

The invention presented differs from conventional use which use combustion engines (that uses any type of energy) and generators in all types of vehicle.

DESCRIPTION OF THE RELATED TECHNIQUE

Although cars with regenerative brakes, have been developed from a vehicle's power is able to be generated in different modalities to just stop. The market needs a vehicle capable of generating the same power you see rolling down the street.

SUMMARY OF THE INVENTION

This section is intended to summarize some aspects of the present invention and to briefly introduce some favorite ways. Simplifications or omissions can be made to avoid the darkening of the purpose of the section. Such simplifications or omissions are not intended to limit the scope of the present invention.

All references, including any patent or patents cited in this report are incorporated herein by reference. Admission is not any reference to constitute previous technique. Discussion of references declares what they claim perpetrators, and the applicants reserve the right to question the accuracy and relevance of the cited documents. Clearly means that, although you are referenced in this document a number of publications of the previous technique, this reference does not constitute an admission that any of these documents form part of the common general knowledge in the technique.

It is recognized that the term "understanding" can, in various jurisdictions, is attributed, either with an exclusive or inclusive sense. For the purposes of this specification, now less that stated otherwise, the term "understanding" will have a significado-es say, including to be taken to mean an inclusion of not only the components in the list referenced directly, but also other components or elements not specified. This reasoning is also used when the term "that includes" or "including" is used in relation to one or more stages in a method or process.

In one respect, the invention is about 1 to use in an engine of power consumption and an electric generator to set lengthens the range of any electric vehicle of two wheels or more, is a primary consideration of the invention.

Other features and advantages of the present invention will become apparent after consideration of the following detailed description of a realization of it, taken together with the accompanying drawings.

BRIEF DESCRIPTION OF DRAWINGS

The FIGS. 1-3 show an illustration of wheels and generators, according to exemplary realizations of the invention.

The above and other features will be appreciated and understood by the experts in the technique from the following detailed description, drawings and claims attached.

DETAILED DESCRIPTION OF THE PREFERRED PREPARATION

To provide a comprehensive understanding of the invention, some illustrative ways and examples will be described now. However, means an ordinary expert in the technique of the same or equivalent functions and sequences can be conducted through different realizations are also intended to be included within the spirit and scope of the Description. Compositions, devices, systems and methods described in this document can adapt and modify as appropriate for the application that is being treated and that those described in this document can be used in other relevant applications, and that such other additions and modifications that will not fall away from reach it the same.

As used in the specification and claims, the singular forms "a", "a" and "the" include plurals references unless the context clearly indicates otherwise. For example, the term "transaction" may include a plurality of transaction, unless the context clearly dictates otherwise. As it is used in the specification and claims, the unique names or reference types include variations within the family of that name, unless the context clearly dictates otherwise.

is used certain terminology in the following description only for convenience, and is not limiting. The words "low," "," "down," upper "top", "front", "behind", "left", "right" and "parties" they indicate directions on the drawings to which reference is made, but are not limited to, with respect to the orientation in which Assembly modules can be used or any of them.

Figure 1:
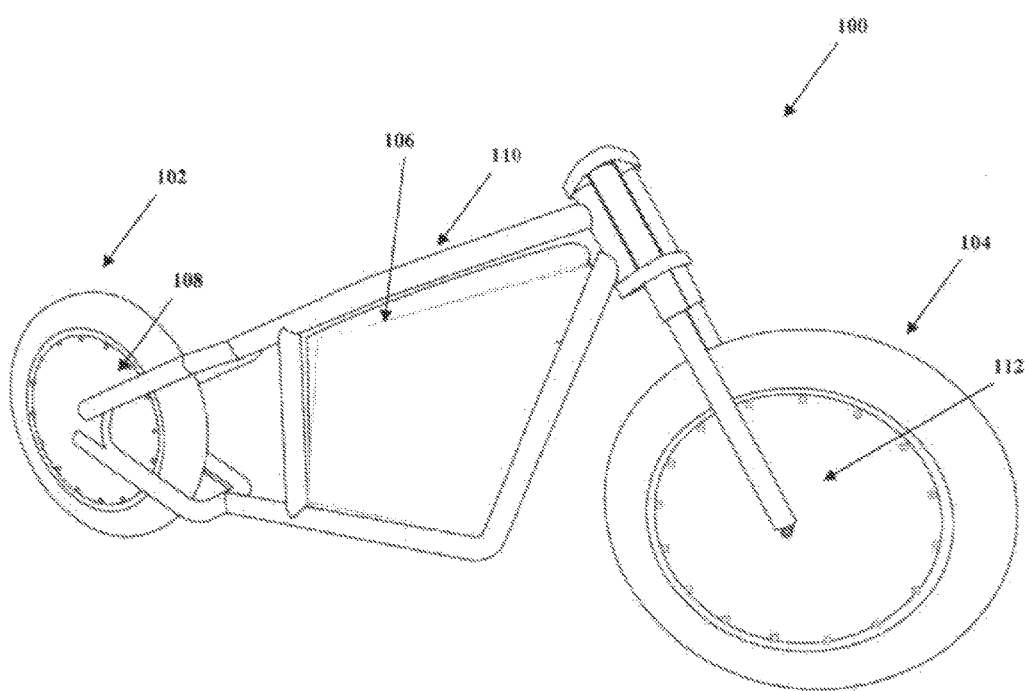
Figure 2:
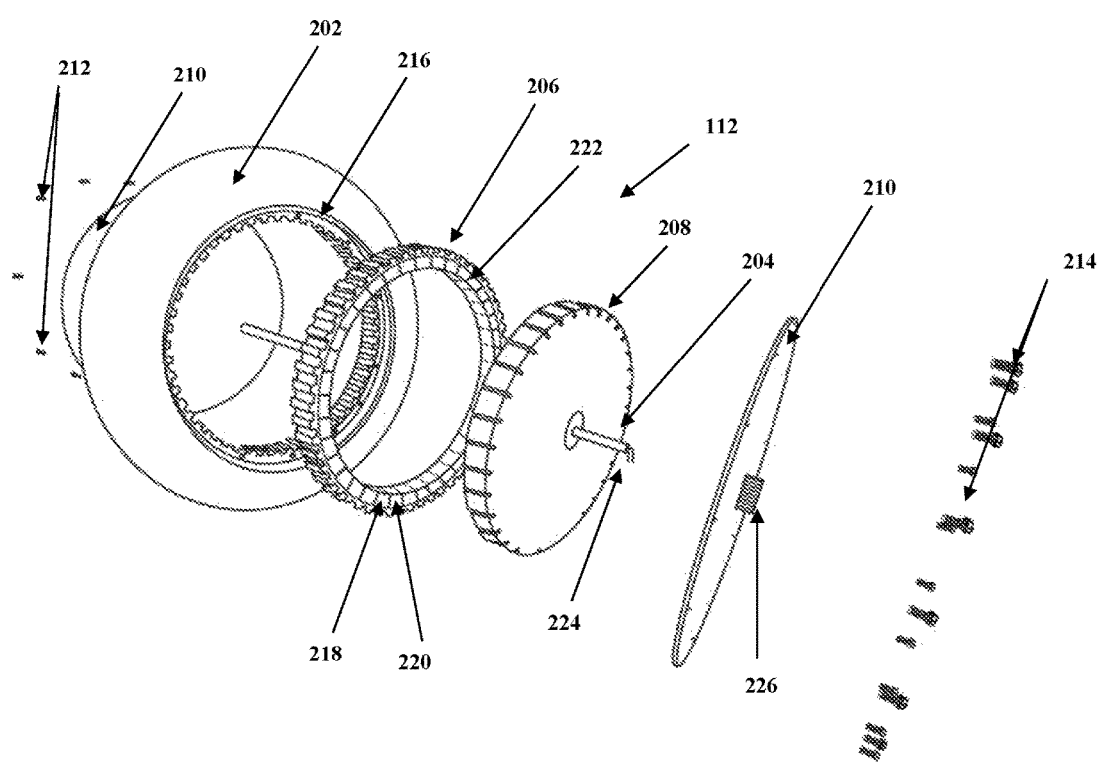
Figure 3:
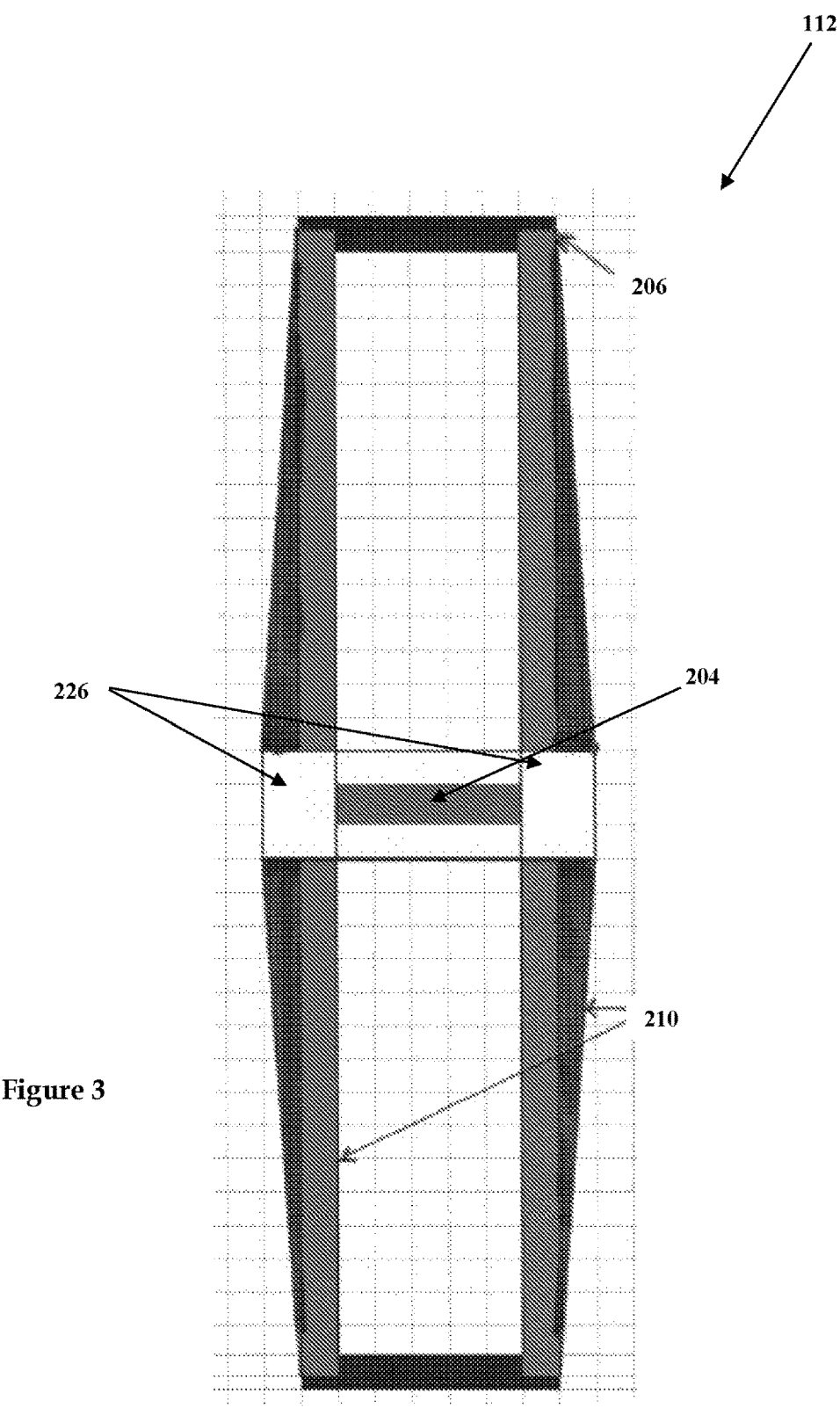

Referring to the FIGS. 1-3 see the table in the middle is the armature or rotor (106). It remains static very firmly attached to the axis of the system (102) without any movement. The metal caps (TM 116) with five circular holes is similar to which carries on the counter and both will be hollow and hermetically sealed. These holes are only for illustration purposes and to see the mechanism in.

The novel way in which the engine and electrical generator (separately) are placed into the hoop of the tyre of any vehicle of two wheels or more, so that makes it perhaps the most efficient of all known systems, with the Elimination of a sinnum ero intermediate operational parts responsible for the movement of the vehicle. Said in other words, the strength of movement is achieved with much less pieces and each piece is eliminated and that adds simplicity to the drive system, prevents the replacement of many parts and adds final thrust as the strength of the electric motor becomes direct system driver of the vehicle.

No less innovative is the way that operate such engines and electric alternators, a diametrically opposed to the conventional. For purposes of simplifying the explanation of the invention, at this time I will discuss only the function of electric motor driving the vehicle; later I will give an explanation of how to operate the electrical alternator, which is extremely simple and simple.

Diagram shows the system right from the front and side. Are easy recognition and explanation (112) aluminum ring and the rubber (114). The "Field Magnet" (108) that surrounds the armature or rotor (106), is placed within a COverture Metalica Circular (CMC—110) which in turn on the exterior will be attached to the ring of aluminum) 112), which will take its corresponding pneumatic (114) and give movement to the vehicle. The armature or rotor (106) which is the main mass of the engine is attached to the center of the drawing and is fixed with a shaft (102) in its center that does not allow either of them to turn. On balls (104) boxes they rest and join these Tapas Metalicas (116) responsible for holding the COverture Metalica Circular CMC (110), with magnetic field attached to it, in addition to the ring (112) and paste the vehicle (114).

For the first time is reversed the traditional movement of an electric motor and is left fixed armor, mass or rotor of electric motor, therefore the part that rotates is the external magnetic field, which by custom is that stays static. We see that the magnetic field is placed inside a "C Metalica Overture Circular (CMC 110), which is the base of the ring on the outside (112) of the wheel of the car." (114)

To both sides of the COverture Metalica Circular (CMC 110), drawing on the right, are placed two Tapas M(TM 116) etalicas that are "system support". In the center of both covers will be boxes of balls (104) allowing to rotate the C Metalica Circular Overture (CMC 110) with its magnetic field (108) inside and covers Metal (116) together as a single unit, as well as the ring (112) and rubber (114) swirling naturally next to them. Again, the only part that jira is not the armature or rotor motor which is traditionally that rotates. The operation of the electric generator which will be placed in the front wheel is described below. Basically all as explained above for the electric motor, (which will be placed at the rear wheel) apply with the electric generator which will be placed in the front wheel. Just change your electro-mechanical composition resulting in that rather than consuming electricity will produce it.

This invention is not directed to single-wheel vehicles. The electric motor will be placed into the rear hoop paste and only the outer part of the electric motor (field magnet (108) will not rotate the central part of the electric motor (mass, armature or rotor 106) that will continue to fixed and) static within the ring hollow. The outside (108 magnetic field) of the electric motor, will be attached to a Circular metal coverage, (CMC—110) which in turn on the exterior will be attached to the rim of the wheel (112), which will take the corresponding pneumatic (114) and give movement to the vehicle. CMC (110)=joins the Field Magnet (108) ring (112) of the pneumatic (114), also on their sides to the metal caps (TM 116). Shafts (102) holding boxes of balls (104), must be firmly fixed every time you want to ensure you don't have any movement, as well as armature or Rotor of the Motor or electric generator (106).

Through the inside of the axis (102) to circulate the corresponding cables carrying and returning electricity. The outside turning in both electric motors, or Field Magnet (108) which in turn is linked to the C Metalica Circular Overture (CMC 110) and ring (112) will be attached to two T APAs Metalicas (116), which will be attached to the boxes of balls that revolved around the central axis in the Centre. These Tapas Metalicas (116), as well as serving as support for the C Metalica Circular Overture (110) and support of all parts that rotate, will be the protection of the electric motor or alternator against the inclemencies of the time and/or debris on the road. Disc brakes are placed on one side of the metal covers covering the engine or generator. Only in the case of the motor.

Electricity that will draw the wheel for their displacement will come from a Bank of batteries that will be placed where it is traditionally placed the carburetion engine, transmission and the conventional motor gasoline tank and in this case, trucks and other vehicles with greater capacity to put these batteries, its accommodation and distribution will be different. This greater accumulation of electricity in batteries will allow a greater radius of action in all types of vehicle in which you use this system. Batteries will have a set of extra charge of electricity at home or source external electricity through an internal inverter which changed the AC current to DC. Electricity DC generated by the motor when it is in motion will greatly help extend the range of the vehicle while it is in motion. A marker of the amount of charge power DC in their batteries will let you know your operator the amount of remaining time remaining to operate it.

The same principles and electro-mechanical distribution described here apply to any vehicle of three, four or more wheels. This specifically means that the system here described and tested has application in vehicles of all types; cars, trucks, trains, and all types of land units. In other words, everything that currently moves through the use of any solar, electric or fossil fuel, can be operated through the system here described DC electricity production and consumption.

The dimensions of the Electric Motor as on Electrical generator, saved relationship according to the size of the wheel and the power to be obtained from them. The indicated above applies also in the design and manufacture of the following parts and components, just to mention the most important vehicle: box of balls of wheels, pastes and rings of the wheels, the brake discs, number and capacity of accumulators.

CONCLUSION

At the end of the detailed description, must be taken into account that would be obvious to the experts in the technique that many variations and modifications can be made to the preferred implementation without substantially departing from the principles of the present invention. In addition, such variations and modifications are intended to be included in this document within the scope of the present invention as outlined in the attached claims. Moreover, in claims on, structures, materials, actions and equivalents of all media and paso functional elements more intend to include any structure, material, or acts for the performance of these duties.

Fits realizations previously described in the present invention, in particular any "preferred forms of realization" are just possible examples of implementations, simply for a clear understanding of the principles of the invention. Variations and modifications can be made to the achievements described above of the invention without substantially departing from the spirit of the principles of the invention. All these modifications and variations is intended to be included in this document within the scope of the invention and the present disclosure and protected by the following claims.

The present invention has been described in sufficient detail with a certain degree of particularity. These utilities are appreciated by the experts in the technique. Is understood by the experts in the technique that the present description of forms of preparation has been done as of only and that numerous changes in the arrangement and combination of parts examples can be used without departing from the spirit and scope of the invention as is claims. As a result, the scope of the present invention is defined by accompanying claims rather than the above description of achievements.

I claim:
1. A wheeled vehicle apparatus comprising;
   two or more wheels assemblies, said assemblies comprised of one or more energy generating wheel assembly, and one or more drive wheel assembly;
   an electric energy storage component;
   one or more electric energy generators, each said generator mechanically linked to at least one said drive wheel assembly;
   one or more electric motors, each said motor being mechanically linked to at least one generating wheel; and an electric control and distribution system connecting and controlling said one or more motors, said one or more generators and said energy storage component.

2. The apparatus of claim 1 wherein;
each said generator is completely housed within one said generating wheel assembly.

3. The apparatus of claim 2 wherein;
said generator is housed within the tire rim.

4. The apparatus of claim 3 wherein;
each said motor is completely housed within one said drive wheel assembly.

* * * * *